Sept. 29, 1931.    E. R. CROSS    1,825,336
WEIGHING SCALE
Filed May 24, 1928    2 Sheets-Sheet 2
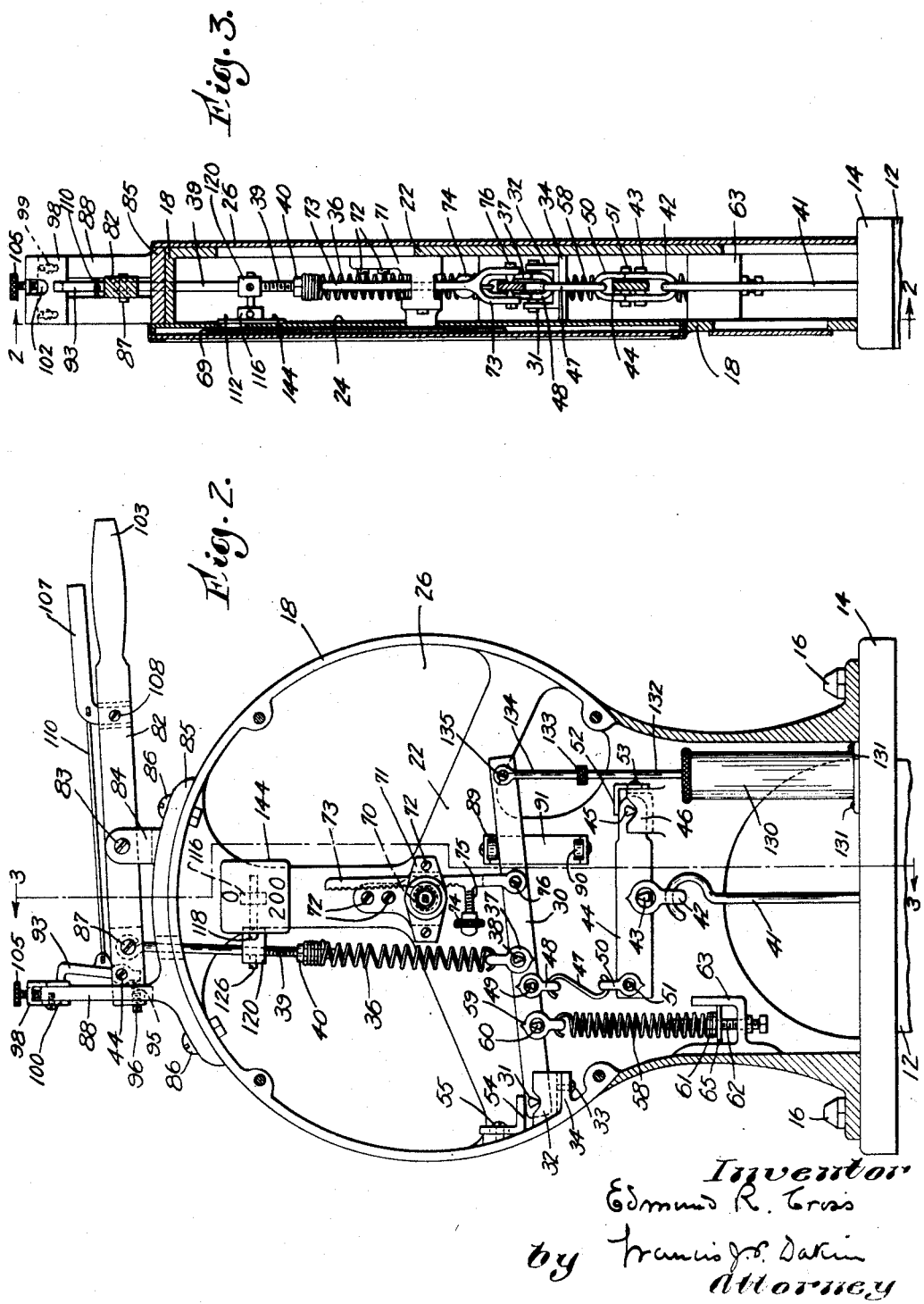
Inventor
Edmund R. Cross
by Francis J. Dakin
Attorney Patented Sept. 29, 1931

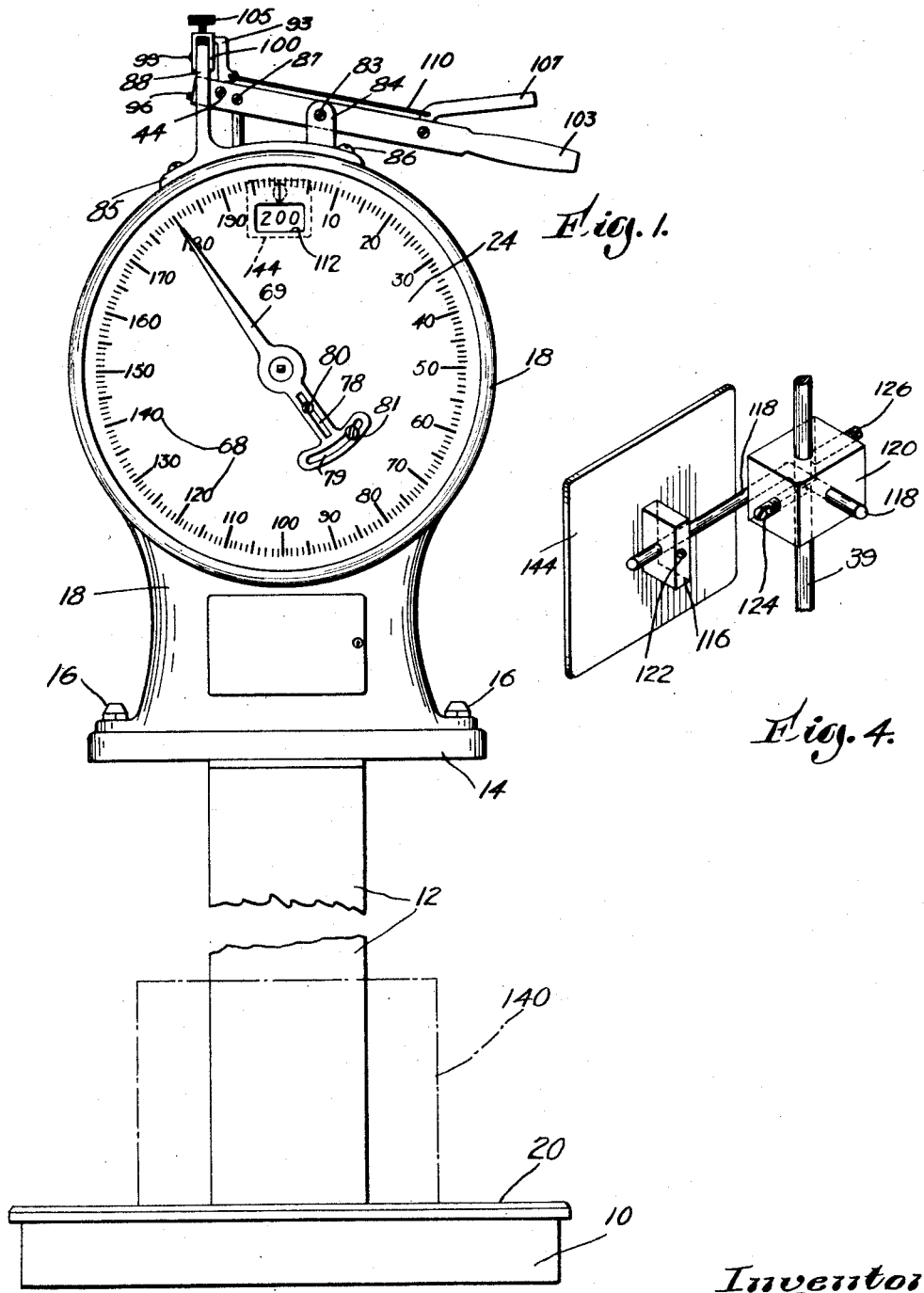

1,825,336

UNITED STATES PATENT OFFICE

EDMUND R. CROSS, OF ARLINGTON, MASSACHUSETTS, ASSIGNOR TO CHADWICK & CARR COMPANY, OF BOSTON, MASSACHUSETTS, A CORPORATION OF MASSACHUSETTS

WEIGHING SCALE

Application filed May 24, 1928. Serial No. 280,325.

This invention relates to weighing scales and more particularly to a scale having provision for varying the capacity thereof at the will of the operator.

In those types of weighing scales employing various forms of dials for indicating the weights and particularly in the types using clock dials, difficulty has heretofore been experienced in securing weight indications of fractions of pounds without increasing the size of the dial beyond practical limits. For instance, in platform scales employing a clock dial and of a capacity of several hundred pounds, it has been necessary in order to secure accurate weighings to fractions of a pound to use a very large dial which is objectionable because it makes the scale cumbersome and increases the friction therein due to the weight of the pointer and the dial operating mechanism. Attempts have been made to obviate the use of large dials by having the pointer make a plurality of complete revolutions around the dial for taking care of the capacity of the scale but this method greatly increases the possibility of mistakes in reading the dial and necessitates the use of additional indicators for showing the number of revolutions made by the pointer for any given weight. The movement of the scale-beam through a wide arc which such a method involves also adds to the difficulty of securing accuracy and in platform scales especially it necessitates excessive movement of the platform levers which is objectionable for the same reason.

One of the objects of the present invention is the provision of a scale having dial indicating means of moderate size for indicating fractions of pounds in order to secure accuracy in the weighing operation.

To this end, means are provided for varying the capacity of the scale from time to time at the will of the operator to correspond to the weights of the objects being weighed which results in a substantial reduction of the size of the dial without sacrificing fractional graduations and accuracy in weighing.

In accomplishing this purpose, I provide means for varying the effect of the weight resisting member on the scale-beam to divide the capacity of the scale into two or more divisions at the same time changing the starting designation to correspond. For instance, in a scale designed for a capacity of four hundred pounds, the dial may be marked for two hundred pounds with the weight resisting member adjusted to that capacity. By increasing the effect of the weight resisting member upon the scale-beam to two hundred pounds, at the zero point, the capacity of the scale is then doubled and the dial may be changed to correspond by displacing the zero graduation with one for two hundred pounds.

Another object of the invention is the provision of simple and efficient means for varying the effect of the weight resisting member which is capable of being operated instantaneously and without appreciable effort at the will of the operator so that the capacity of the scale may be changed to suit the need of the moment.

Other objects of the invention will be more specifically set forth and described hereinafter.

In the drawings is shown for the purpose of illustrating my invention a dial platform scale constructed and adapted to be operated in accordance therewith in which Figure 1 is a front elevation of the scale with the means for varying the effect of the weight resisting member shown in operative position; Fig. 2 is a front elevation of the top portion of the scale with the dial removed and the lower part of the dial frame cut away to expose the scale mechanisms, the weight resisting member varying means being shown in inoperative position; Fig. 3 is a vertical cross-sectional view on line 3—3 in Fig. 2, looking from right to left; and Fig. 4 is a view in perspective of a movable dial-plate for changing the initial graduation on the dial when the capacity of the scale is changed.

Referring to the drawings, particularly Figure 1, in which is shown a dial platform scale, 10 designates a base having an upright standard 12 carrying a top-plate 14 to which is fastened by screw bolts 16 a dial frame 18. A platform 20 is supported upon platform levers of usual construction (not shown) within the base. The dial frame is flat and circular of general clock form in its upper part and somewhat restricted in the form of a neck in its lower or base part where bolted to the top plate. Integral with the frame is a skeleton back 22 which serves as a support for various parts of the weighing mechanism and in its front the frame has a circular opening to receive a circular dial 24. The back of the frame may be closed by a back plate 26. The dial frame may, however, be constructed in any suitable manner.

Within the dial frame is mounted a main scale-beam or lever 30 (Fig. 2) fulcrumed at one end by knife edges 31 set in the beam and supported in bearings 32 secured by screws 33 to a bracket 34 projecting inwardly from one side of the dial frame 18. A weight resisting member in the form of a helical spring 36 is connected to the scale-beam by means of a loop bearing 37 in which rides knife edges 38 set in the scale-beam and the upper end of the spring is connected to a threaded rod 39 by a nut 40 rotatably mounted in and secured to that end of the spring. Suitable connections are provided between the scale-beam and the platform levers comprising a steelyard 41 connected at its lower end to the said levers and at its upper hooked end to a loop 42 riding on knife edges 43 set in a multiplying lever 44. At one end this lever is fulcrumed through the medium of knife edges 45 supported by bearings 46 on the inner face of the skeleton back 22 of the dial frame and at the other end the lever is connected to the scale-beam by a link 47 hooked into a loop bearing 48 riding on knife edges 49 set in the scale-beam and a loop bearing 50 engaging knife edges 51 set in the multiplying lever. To hold the fulcrumed end of the lever down and to prevent its jumping if the scale is operated suddenly a right-angled stop 52 is fastened to the bearing 46 by a screw 53 and a similar stop 54 is secured by a screw 55 to the dial frame to hold down the fulcrumed end of the scale-beam.

To facilitate the adjustment of the scale-beam, an adjusting spring 58 under tension is, at its upper end, hooked into a bearing loop 59 riding on knife edges 60 set in the scale-beam and at its lower end is fastened to a nut 61 threaded on a screw-pin 62 mounted in a bracket 63 on the dial frame. A lock-nut 64 abutting the base of the bracket holds the spring in adjusted position and a square washer 65 fastened to the nut 61 and fitting within the bracket prevents the turning of the spring or the nut when being adjusted. By means of the adjusting spring, the scale-beam can be accurately adjusted to the zero point when there is no weight on the scale platform.

For indicating the weight of the article on the scale platform the circular dial 24 is provided with suitable graduations 68 with which cooperates a pointer 69 operated by the movement of the scale-beam. Any suitable means may be provided for this purpose and one such is shown in which the pointer is fixed on a pinion 70 rotatably mounted in a bearing bracket 71 fastened by screws 72 to the skeleton back 22, said pinion meshing with a rack-bar 73 pivotally and loosely mounted on the scale-beam in an upright position. The rack-bar is held in mesh with the pinion by a weighted nut 74 threaded on an arm 75 formed on the rack-bar and extending laterally therefrom under the pinion. The degree of pressure exerted on the pinion by the rack-bar due to the position of the weighted nut may be regulated within certain limits to control the friction between the pinion and rack-bar by adjusting the nut on the arm. Disengagement of the rack-bar and pinion is prevented by the bearing bracket 71 which encloses both but the weighted nut holds the rack-bar away from the bracket to avoid frictional contact therewith in its vertical movement. Being loosely mounted on its pivotal screw 76 in the scale-beam, friction at that point is eliminated.

To counter-balance the pointer for the purpose of securing accurate indications at intermediate points on the dial, the back end of the pointer is T-shaped and provided with a longitudinal slot 78 and a curved slot 79 longitudinally the head portion. Movable weights 80 and 81 are mounted in the slots 78 and 79 respectively. Each weight comprises a screw and a nut overlapping the sides of its respective slot so that when set up the weight is held in adjusted position on the pointer. The weight 80 is adjusted to correct indications on the two sides of the dial and the weight 81 for correcting indications on the top and bottom of the dial.

In order to vary the capacity of the scale by increasing or decreasing the tension of the weight resisting member, means are provided for that purpose which are capable of instantaneous operation at the will of the operator. One form of means is shown in the drawings and comprises a lever 82 pivotally mounted on a pin 83 carried by a pair of lugs 84 integral with a curved bracket 85 fastened to the top of the dial frame by screws 86. To the free end of the lever 82 is pivotally connected on a screw 87 the threaded rod 39 fastened to the upper end of the weight resisting spring 36. By operating the lever 82 the tension of the spring 36 may be varied. In Fig. 2, the lever 82 is shown in a lowermost position with its free end resting against a portion of the bracket 85 between two uprights 88 in which position the tension of the weight resisting member or its effect upon the scale beam is adjusted for indications from zero to two hundred pounds during the full movement of the scale-beam between two stops 89 and 90 carried by a bracket 91 on the skeleton back of the dial frame. There two stops determine the range of movement of the scale-beam and are approximately located because the scale-beam should not be in engagement with either one at the zero point or at the capacity point since they are provided for preventing undue movement of the scale-beam.

In order to lock the lever 82 in upright adjusted position, a latch 93 is pivotally mounted on a pin 94 in the free end of the lever and is held in a normally forward position by a spring 95 bearing against the butt of the latch below the pivot pin set in a recess in the end of the lever and held in place by a small screw 96 which may be adjusted to regulate the pressure exerted by said spring. Mounted on top of the upright members 88 is a yoke-plate 98 provided with slots 99 in one side to receive screws 100 set in the uprights so that the yoke-plate may be adjusted vertically on the uprights. The plate is provided with an opening 102 for receiving the nose of the latch 93 so that when the handle end 103 of the lever is depressed, the nose of the latch is thrown automatically by the spring 95 into the opening 102 as soon as the free end of the lever is raised to that point and the lever is thereby held in a raised position. For securing accurate adjustment of the yoke-plate, a small set screw 105 is threaded through its top and bears against a cross-piece connecting the two uprights 88 so that a micrometer adjustment of the yoke-plate may be secured in order to determine the exact point to which the lever 82 should be raised when the tension of the spring 36 is being increased. For convenience of the operator in releasing the latch when returning the parts to their normal position, a latch lever 107 is pivotally mounted on a screw 108 adjacent the handle end of the lever 82 which latch lever is pivotally connected by a rod 110 to the latch 93. By pressing the latch lever toward the main handle 103 the latch is pulled out of the opening 102 and the parts may then be restored to normal position. Preferably, to release the latch when the spring 36 is distended and the lever is in the position shown in Fig. 1, the handle 103 should be slightly depressed before pressing down the latch lever 107.

In the illustrated embodiment of the invention the opening 102 for receiving the latch nose is so adjusted that when the latch lies therein the tension of the weight resisting spring has been increased to an effective weight-resisting force on the scale-beam of two hundred pounds and the scale-beam is then at the zero point in engagement with the upper stop 89. To move the scale-beam under such circumstances, the weight on the platform must exceed two hundred pounds in consequence of which I provide means operated by the lever 82 for changing the initial graduation on the dial from zero to two hundred when the lever is moved to increase the tension of the weight resisting spring and one form of such means comprises the following.

In the dial 24 at the zero point, a rectangular opening 112 is cut out behind which is arranged a movable plate 144 marked "0" and underneath "200". The plate is provided on its back face with a block 116 pierced to receive one end of a rod 118 (Fig. 4), the other end of which is bent at right angles and passed through a block 120 which in turn is centrally mounted on the rod 39. A set-screw 122 in the block 116 and two set screws 124 and 126 in the block 120 serve to hold the two blocks in adjusted positions with relation to the rods 118 and 39. This arrangement permits the plate to be adjusted both horizontally and vertically so that when the parts are in normal position the mark "0" will appear in the opening 112 but when the weight resisting spring is extended by the lever 82 then the plate moves upwardly with the rod 39 exposing the mark "200" instead of "0" through the opening.

To reduce the oscillations of the scale-beam and to bring it to a quick rest in a weighing operation any suitable form of dash-pot device may be employed and one such is shown comprising a cylinder 130, fixed to the top-plate 24 by screws 131 through the cylinder base flange and a plunger (not shown) of usual construction made up of two disks provided with holes, one of said disks being fixed on the lower end of a tubular rod 132 having at its top a knurled collar 133 and the other of said disks being fixed on the lower end of a rod 134 which is pivotally connected to a pin 135 set in the scale-beam. The rod 134 is mounted within the tubular rod 132 and by turning the latter through the medium of the collar 133, the openings in the plunger may be varied to control the dampening effect of the dash-pot. Any suitable liquid may be used in the dash-pot but preferably oil.

In the use of my scale, the normal position of the parts are as shown in Fig. 2 with the capacity of the scale two hundred pounds. When it becomes necessary to weigh an object of over two hundred pounds, the operator pulls the handle 103 downwardly thereby raising the effective end of the lever until the nose of the latch 93 engages the opening 102 whereupon the latch is forced in by its butt spring locking the lever in raised position as shown in Figure 1. At the same time, the initial graduation is changed from "0" to "200". In Figure 1 there is shown in broken lines an object 140 on the scale platform assumed to weigh 380 pounds as indicated by the pointer, the weight being that indicated by the graduation at which the pointer rests plus two hundred. To restore the scale to a capacity of two hundred pounds, the operator pulls down the handle 103 slightly and at the same time operates the latch lever to pull the latch out of locked position and then allows the tension of the weight resisting spring to pull the lever back to normal position.

It will be observed that the operation of the lever for changing the capacity of the scale is one which requires little or no effort and no appreciable time and is one which will not interfere with continuity of successive weighing operations. One of the principal advantages of my scale is that articles may be weighed in rapid succession because the weight of each article is almost instantly indicated. The use of a multiplying lever intermediate the platform levers and the scale-beam contributes to this end because it cuts down the range of movement vertically of the scale platform and also of the scale-beam. Because of this advantage, a scale constructed in accordance with my invention is especially useful in express and other offices where rapid weighing of numerous articles is of prime importance.

Although in the embodiment of the invention herein shown, the capacity of the scale is doubled, it is to be understood that I am not to be limited to that particular increase, since in some instances it may be desirable to provide for trebling the capacity of the scale in addition to doubling its capacity and this can be done by increasing the height of the uprights 88 and providing one or more additional recesses to receive the latch on the lever. Various degrees of increase may be provided for so long as the tension of the weight resisting spring is not strained too far.

My invention is also capable of embodiment in other forms of construction than that shown herein and described all within the purview of the following claims.

What I claim is:

1. In a weighing scale, the combination of a scale-beam, a support for the article being weighed, a weight resisting member, both said support and said member being connected to said scale-beam, weight indicating means having graduations and means operable at the will of the operator for varying the effect of said weight resisting member upon said scale beam to vary the capacity of the scale and for simultaneously changing the initial graduation on said indicating means to correspond with the change in capacity of the scale.

2. In a scale, the combination of a scale-beam, a weight resisting member connected to said scale-beam, a support for the article to be weighed connected to said scale-beam, indicating means having graduations and operated by the movement of the scale-beam and means for varying the effect upon said scale beam of said weight resisting member to vary the capacity of the scale and for simultaneously changing the initial graduation on said indicating means to correspond with the change in capacity of the scale.

3. In a scale, the combination of a scale-beam, a weight resisting member and a support for the article being weighed, both pivotally connected to said scale-beam, a dial provided with graduations, a pointer cooperating with said dial and operated by said scale-beam, lever operated means for varying the effect of said weight resisting member upon said scale-beam to vary the capacity of the scale and for simultaneously changing the initial graduation on said dial to correspond with the change in capacity of the scale.

4. In a scale, the combination of a scale-beam, a spring weight resisting member, a support for the article to be weighed, both said weight resisting member and said support being connected to said scale-beam, indicating means having graduations and operated by the movement of said scale-beam and a lever connected to said weight resisting member for varying the tension of the same to vary the capacity of said scale and for simultaneously changing the initial graduation on said indicating means to correspond with the change in capacity of the scale.

5. In a weighing scale, the combination of a scale-beam, a support for the article to be weighed connected to said scale-beam, a weight resisting member connected to said beam for opposing the weight on said support, means provided with graduations for indicating the weight, means whereby said indicating means is operated by the movement of the scale-beam and means for varying the effect of the weight resisting member upon said scale-beam to vary the capacity of the scale and for simultaneously changing the initial graduation on said indicating means to correspond with the change in capacity of the scale.

6. In a weighing scale, the combination of a scale-beam, a support for the article being weighed, a spring for resisting the weight, both said support and said spring being connected to said scale-beam, weight indicating means having graduations, a lever for changing the tension of said spring to vary the capacity of said scale and for simultaneously changing the initial graduation on said indicating means to correspond with the change in capacity of the scale, and means for locking said lever in adjusted position.

7. In a weighing scale, the combination of a scale-beam, a weight resisting member, a support for the article to be weighed, both pivotally connected to said scale-beam, indicating means operated by said scale-beam, a lever for varying the effect of said weight resisting member upon said scale-beam to vary the capacity of the scale and means controlled by said lever for changing the initial graduation on said indicating means to correspond with the change of capacity of said scale when said lever is operated.

8. In a scale, the combination of a scale-beam, a weight resisting spring, a support for the article being weighed, both pivotally connected to said scale-beam, indicating means comprising a dial having graduations and a pointer, means whereby said pointer is operated by the movement of said scale-beam and means for varying the effect of said weight resisting spring upon said scale-beam to vary the capacity of the scale and for simultaneously changing the initial graduation on said dial to correspond with the change in capacity of the scale.

9. In a weighing scale, the combination of a scale-beam, a weight resisting spring, a support for the article being weighed, both pivotally connected to said scale-beam, a dial having graduations, a pointer cooperating with said dial to indicate the weight, means for operating said pointer by the movement of said scale-beam, a lever connected to said spring for varying the effect thereof upon said scale-beam to vary the capacity of the scale and for simultaneously changing the initial graduation on said dial to correspond with the change in capacity of the scale and means for locking said lever in adjusted position.

10. In a scale, the combination of a scale-beam, a weight resisting spring, a support for the article being weighed, both pivotally connected to said scale-beam, indicating means provided with graduations and operated by said scale-beam, a lever connected to said spring for varying its tension to vary the capacity of the scale and for simultaneously changing the initial graduation on said indicating means to correspond with the change in capacity of the scale, a latch carried by said lever for holding the same in adjusted position when the capacity of the scale is varied from its normal capacity.

11. In a single dial scale, the combination of a scale-beam, a weight resisting spring, a support for the article being weighed, both pivotally connected to said scale-beam, an adjusting spring, a lever connected to said weight resisting spring for varying the tension thereof to change the capacity of the scale and for simultaneously changing the initial graduation on said dial to correspond with the change in capacity of the scale and means for locking said lever in adjusted position whenever the capacity of the scale is varied.

12. In a single dial scale, the combination of a scale-beam, a weight resisting spring pivotally connected to said scale-beam, a support for the article being weighed also connected to said scale-beam, a lever connected to the other end of said weight resisting spring for varying the effect of said weight resisting spring upon said scale-beam to vary the capacity of the scale and for simultaneously changing the initial graduation on said dial to correspond with the change in capacity of the scale, a latch mounted on the free end of said lever for locking it in adjusted position and a spring in the end of said lever bearing against the butt of said latch for holding it in forward locking position.

13. In a single dial scale, the combination of a scale-beam, a weight resisting spring pivotally connected to said scale-beam, a support for the article being weighed also connected to said scale-beam, a lever connected to the other end of said weight resisting spring for varying the effect of said weight resisting spring upon said scale-beam to vary the capacity of the scale and for simultaneously changing the initial graduation on said dial to correspond with the change in capacity of the scale, and spring pressed means for locking said lever in adjusted position.

14. In a single dial scale, the combination with a spring weight resisting member of means for varying the effect of said member to vary the capacity of the scale and for simultaneously changing the initial graduation on said dial to correspond to the change in capacity and means for locking said varying means in adjusted position.

15. In a single dial scale, the combination with a spring weight resisting member of means for varying the effect of said member to vary the capacity of the scale and for simultaneously changing the initial graduation on said dial to correspond to the change in capacity.

16. In a single dial scale, the combination of a scale-beam, a weight resisting member and a support for the article being weighed, both pivotally connected to said scale-beam, and means for varying the effect upon said scale-beam of said weight resisting member to vary the capacity of the scale and for simultaneously changing the initial graduation of the dial to correspond to said change in capacity.

17. In a single dial scale, the combination with a spring weight resisting member of a lever for varying the effect of said member to vary the capacity of the scale and for simultaneously changing the initial graduation on said dial to correspond to the change in capacity and means for locking said lever in adjusted position.

18. In a single dial scale, the combination with a spring weight resisting member of a lever for varying the effect of said member to vary the capacity of said scale and for simultaneously changing the initial graduation of the dial to correspond to the change in capacity of the scale and a spring pressed latch mounted on the free end of said lever for locking it in adjusted position.

19. In a scale, the combination with a dial and a spring weight resisting member of means for varying the effect of said member to vary the capacity of the scale and simultaneously for changing the initial graduation of the dial to correspond to said change in capacity.

20. In a scale, the combination of a dial having an opening for the initial graduation, a spring weight resisting member, means for varying the effect of said member to vary the capacity of the scale and a plate carrying a plurality of different initial graduations, said plate being carried by said member for registering with said opening in said dial for changing the initial graduation visible through said opening.

In witness whereof, I hereunto set my hand this twenty-third day of May, 1928.

EDMUND R. CROSS.